(12) United States Patent
Taki et al.

(10) Patent No.: US 7,681,545 B2
(45) Date of Patent: Mar. 23, 2010

(54) STARTING APPARATUS FOR INTERNAL COMBUSTION ENGINE AND AUTOMOBILE

(75) Inventors: Nobuyuki Taki, Anjo (JP); Minoru Kato, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 23 days.

(21) Appl. No.: 10/577,706

(22) PCT Filed: Oct. 19, 2004

(86) PCT No.: PCT/JP2004/015772

§ 371 (c)(1),
(2), (4) Date: May 2, 2006

(87) PCT Pub. No.: WO2005/045239

PCT Pub. Date: May 19, 2005

(65) Prior Publication Data

US 2007/0084429 A1   Apr. 19, 2007

(30) Foreign Application Priority Data

Nov. 11, 2003 (JP) ............................. 2003-381474

(51) Int. Cl.
*G06F 19/00* (2006.01)
*G06G 7/70* (2006.01)
(52) U.S. Cl. .................. 123/179.3; 123/179.4; 701/113
(58) Field of Classification Search .............. 123/179.3, 123/339.14; 464/183; *G06F 19/00*; *G06G 7/70*
See application file for complete search history.

(56) References Cited

U.S. PATENT DOCUMENTS

| 4,022,164 | A | * | 5/1977 | Fuchs | 123/339.14 |
| 5,114,769 | A | * | 5/1992 | Kani et al. | 428/37 |
| 5,323,743 | A | * | 6/1994 | Kristiansson | 123/179.3 |
| 5,458,098 | A | * | 10/1995 | Yagi et al. | 123/179.3 |
| 5,460,138 | A | * | 10/1995 | Hasegawa | 123/179.3 |
| 2003/0140881 | A1 | | 7/2003 | Makajima et al. | |

FOREIGN PATENT DOCUMENTS

CN            1413291 A       4/2003

(Continued)

*Primary Examiner*—Stephen K Cronin
*Assistant Examiner*—Keith Coleman
(74) *Attorney, Agent, or Firm*—Kenyon & Kenyon LLP

(57) ABSTRACT

An idling stop control of the invention attains an auto start and an auto stop of an engine. At a time point t1, pre-set stop conditions are met to cut off a fuel supply to the engine. Preset starting conditions may be met at a time point t2 when the engine still continues rotating in a normal direction by the inertial force. In this state, the idling stop control starts cranking the engine. The preset starting conditions may be met at a time point t4 when a piston does not complete a compression cycle immediately before a stop of the engine but is pressed back by the compressed air to rotate the engine in a reverse direction. In this state, the idling stop control waits until cancellation of the reverse rotation of the engine and then starts cranking the engine. The arrangement of the invention desirably ensures a quick start of the engine, while effectively preventing an excess stress from acting on a gear mechanism, which connects a starter motor to the engine.

7 Claims, 6 Drawing Sheets

FOREIGN PATENT DOCUMENTS

| | | |
|---|---|---|
| EP | 1 233 175 A1 | 8/2002 |
| FR | 2 688 548 | 9/1993 |
| JP | 04-159455 | 6/1992 |
| JP | 2000-120514 | 4/2000 |
| JP | 2001-173545 A | 6/2001 |
| JP | 2002-061554 | 2/2002 |
| JP | 2002-147319 A | 5/2002 |
| JP | 2003-065104 | 3/2003 |
| JP | 2003-83146 A | 3/2003 |
| JP | 2004-343906 A | 12/2004 |

* cited by examiner (a)

(b)

(a)

(b)

STARTING APPARATUS FOR INTERNAL COMBUSTION ENGINE AND AUTOMOBILE

This is a 371 national phase application of PCT/JP2004/015772 filed 19 Oct. 2004. Claiming priority to Japanese Patent Application No. 2003-381474 filed 11 Nov. 2003, the contents of which are incorporated herein by reference.

TECHNICAL FIELD

The present invention relates to a starting apparatus for an internal combustion engine, as well as to an automobile.

BACKGROUND ART

A known starting apparatus for an internal combustion engine uses a starter motor, which is always linked to a crankshaft of the engine via a jaw gear, to crank the engine (see, for example, Japanese Patent Laid-Open Gazette No. 2000-120514). One proposed starting apparatus prohibits the starter motor from cranking the engine until a condition of zero revolution speed, which is triggered by an engine stop, is kept for a predetermined time period in response to a driver's OFF operation of a start switch for starting the engine (see, for example, Japanese Patent Laid-Open Gazette No. 2002-61554). This prior art starting apparatus prohibits the starter motor from cranking the engine in response to the driver's ON operation of the start switch while the engine does not completely stop the engine. This prohibits cranking the engine in the state of reverse rotation of the engine, where a piston does not complete a compression cycle immediately before a stop of the engine and is pressed back by the compressed air, thus desirably preventing an excess load from being applied to the starter motor.

DISCLOSURE OF THE INVENTION

This prior art starting apparatus for the internal combustion engine responds to reverse rotation of the engine, which may be caused by the driver's OFF operation of the start switch, but does not take into account reverse rotation of an engine, which has functions of auto start and auto stop without the driver's operation to enhance the operation efficiency. The prior art starting apparatus permits the starter motor to crank the engine in response to the driver's ON operation of the start switch only when the engine completely stops. This may interfere with a quick start of the engine.

The starting apparatus for the internal combustion engine and the corresponding automobile of the invention thus aim to prevent an excess load from being applied to a cranking device and a power transmission system in the process of cranking an internal combustion engine having functions of auto start and auto stop. The starting apparatus for the internal combustion engine and the corresponding automobile of the invention also aim to ensure a quick start of the internal combustion engine.

In order to achieve at least a part of the aforementioned objects, the starting apparatus for the internal combustion engine and the corresponding automobile of the invention are structured as follows.

The starting apparatus of the invention is the starting apparatus for the internal combustion engine mounted on an automobile to automatically start the internal combustion engine after an auto stop of the internal combustion engine, and the starting apparatus includes: a cranking module that is always connected to an output shaft of the internal combustion engine via a power transmission member and cranks the internal combustion engine through actuation of a rotating shaft, which is interlocked with rotation of the output shaft; a reverse rotation presumption module that presumes reverse rotation of the internal combustion engine; and a cranking control module that prohibits cranking of the internal combustion engine regardless of fulfillment of an auto start condition, when the reverse rotation presumption module presumes the reverse rotation of the internal combustion engine.

In response to presumption of the reverse rotation of the internal combustion engine having the functions of auto start and auto stop, the starting apparatus for the internal combustion engine of the invention inactivates the cranking module, which is always connected to the output shaft of the internal combustion engine via the power transmission member and actuates the rotating shaft that is interlocked with rotation of the output shaft, and prohibits cranking the internal combustion engine, regardless of the fulfillment of the auto start condition. This arrangement prohibits cranking the internal combustion engine having the functions of auto start and auto stop in the state of the reverse rotation of the internal combustion engine and thereby effectively prevents an excess load from being applied to a driving system of the automobile, especially the power transmission member. Here the terminology 'reverse rotation' represents any rotation, under which cranking of the internal combustion engine may cause application of an excess load to the driving system. The reverse rotation is not restricted to a specific rotation range where the revolution speed of the internal combustion engine first falls below zero and then rises to be approximately equal to zero for a stop, but includes rotation other than this specific rotation range. The 'cranking module' may be a standard motor or a motor generator that is capable of generating electric power.

In the starting apparatus for the internal combustion engine of the invention, the cranking control module may control the cranking module to crank the internal combustion engine even before completion of a stop operation of the internal combustion engine, which is triggered by fulfillment of an auto stop condition immediately before fulfillment of the auto start condition, when the reverse rotation presumption module does not presume the reverse rotation of the internal combustion engine under fulfillment of the auto start condition. The starting apparatus for the internal combustion engine of this arrangement cranks the internal combustion engine in the case of no presumption of the reverse rotation of the internal combustion engine, even when the internal combustion engine does not completely stop. This arrangement ensures a quick start of the internal combustion engine.

Further, the starting apparatus for the internal combustion engine of the invention may include a revolution speed measurement module that measures a revolution speed of the internal combustion engine, and the reverse rotation presumption module may presume the reverse rotation of the internal combustion engine, based on the measured revolution speed of the internal combustion engine. In this case, the reverse rotation presumption module may presume the reverse rotation of the internal combustion engine until the measured revolution speed of the internal combustion engine falls below a predetermined level and a predetermined time period elapses after the fall to eliminate any potential for the reverse rotation of the internal combustion engine. This arrangement does not require direct detection of the reverse rotation of the internal combustion engine.

Moreover, in the starting apparatus for the internal combustion engine of the invention, the power transmission member may be either of a full-time jaw gear that couples the output shaft with the rotating shaft and a belt that is spanned between the output shaft and the rotating shaft. The power transmission member may include a one-way clutch that engages in a cranking direction of the internal combustion engine and disengages in a reverse direction.

In the starting apparatus for the internal combustion engine of the invention, the power transmission member may be made of resin. The resin power transmission member restricts potential vibrations and noise due to cranking of the internal combustion engine and reduces the total weight of the starting apparatus, compared with a metal power transmission member. The starting apparatus for the internal combustion engine of the invention desirably prevents an excess stress from being applied to the power transmission member in the process of cranking the internal combustion engine. This assures the sufficient duration of the resin power transmission member.

The automobile of the invention is the automobile with the internal combustion engine mounted thereon, and the automobile includes: a cranking module that is always connected to an output shaft of the internal combustion engine via a power transmission member and cranks the internal combustion engine through actuation of a rotating shaft, which is interlocked with rotation of the output shaft; a reverse rotation presumption module that presumes reverse rotation of the internal combustion engine; and a cranking control module that prohibits cranking of the internal combustion engine regardless of fulfillment of an auto start condition, when the reverse rotation presumption module presumes the reverse rotation of the internal combustion engine.

In response to presumption of the reverse rotation of the internal combustion engine having the functions of auto start and auto stop, the automobile of the invention inactivates the cranking module, which is always connected to the output shaft of the internal combustion engine via the power transmission member and actuates the rotating shaft that is interlocked with rotation of the output shaft, and prohibits cranking the internal combustion engine, regardless of the fulfillment of the auto start condition. This arrangement prohibits cranking the internal combustion engine having the functions of auto start and auto stop in the state of the reverse rotation of the internal combustion engine and thereby effectively prevents an excess load from being applied to a driving system of the automobile, especially the power transmission member. Here the terminology 'reverse rotation' represents any rotation, under which cranking of the internal combustion engine may cause application of an excess load to the driving system. The reverse rotation is not restricted to a specific rotation range where the revolution speed of the internal combustion engine first falls below zero and then rises to be approximately equal to zero for a stop, but includes rotation other than this specific rotation range. The 'cranking module' may be a standard motor or a motor generator that is capable of generating electric power.

In the automobile of the invention, the cranking control module may control the cranking module to crank the internal combustion engine even before completion of a stop operation of the internal combustion engine, which is triggered by fulfillment of an auto stop condition immediately before fulfillment of the auto start condition, when the reverse rotation presumption module does not presume the reverse rotation of the internal combustion engine under fulfillment of the auto start condition. The automobile of this arrangement cranks the internal combustion engine in the case of no presumption of the reverse rotation of the internal combustion engine, even when the internal combustion engine does not completely stop. This arrangement ensures a quick start of the internal combustion engine.

The automobile of the invention may include a revolution speed measurement module that measures a revolution speed of the internal combustion engine, and the reverse rotation presumption module may presume the reverse rotation of the internal combustion engine, based on the measured revolution speed of the internal combustion engine. In this case, the reverse rotation presumption module may presume the reverse rotation of the internal combustion engine until the measured revolution speed of the internal combustion engine falls below a predetermined level and a predetermined time period elapses after the fall to eliminate any potential for the reverse rotation of the internal combustion engine. This arrangement does not require direct detection of the reverse rotation of the internal combustion engine.

In the automobile of the invention, the power transmission member may be made of resin. The resin power transmission member restricts potential vibrations and noise due to cranking of the internal combustion engine and reduces the total weight of the starting apparatus, compared with a metal power transmission member. The automobile of the invention desirably prevents an excess stress from being applied to the power transmission member in the process of cranking the internal combustion engine. This assures the sufficient duration of the resin power transmission member.

BEST MODES OF CARRYING OUT THE INVENTION

Figure 1:
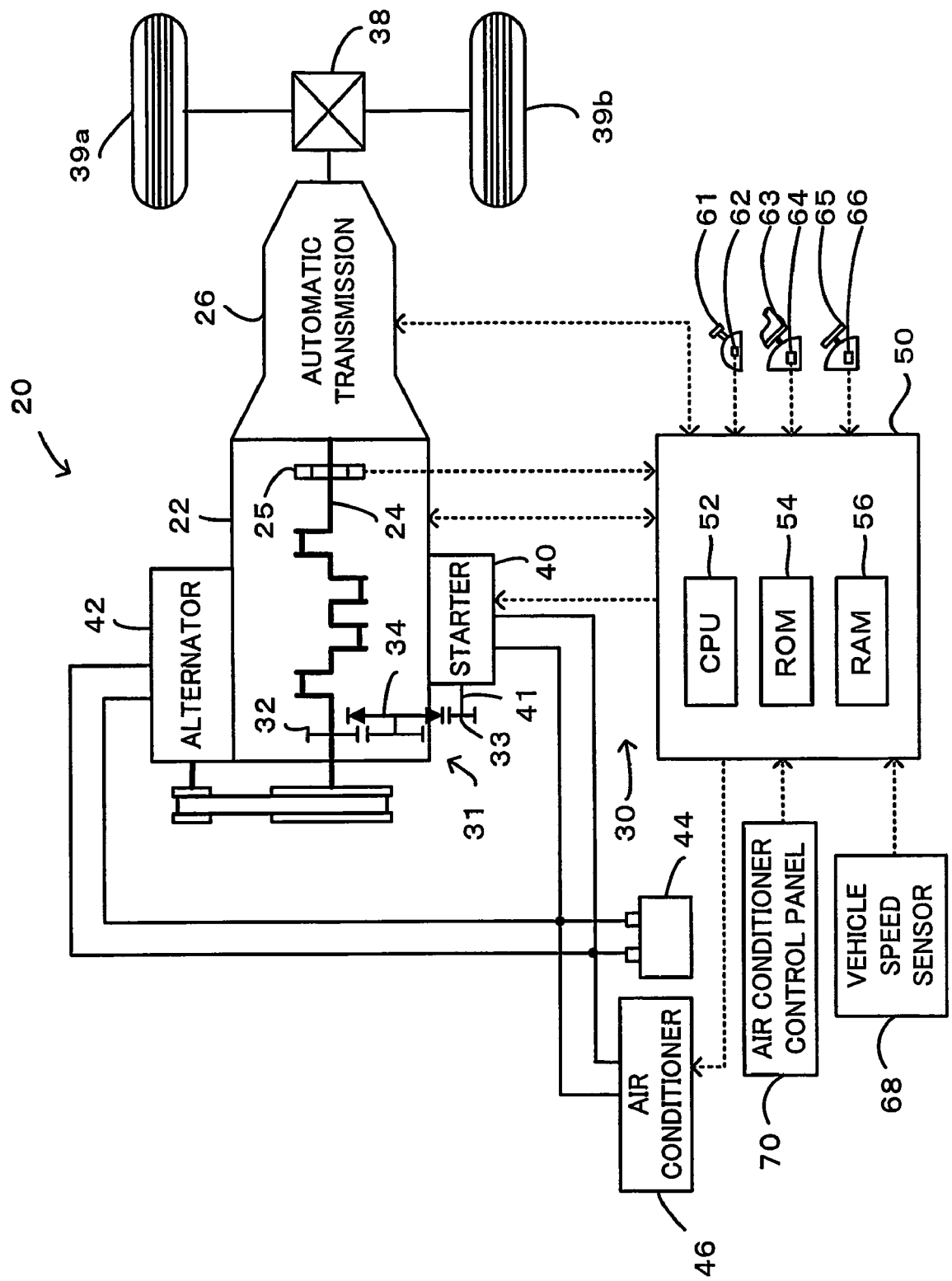
FIG. 1 schematically illustrates the configuration of an automobile 20 with a starting apparatus 30 for an engine 22 mounted thereon in one embodiment of the invention.

One mode of carrying out the invention is discussed below as a preferred embodiment. FIG. 1 schematically illustrates the configuration of an automobile 20 with a starting apparatus 30 for an engine 22 mounted thereon in one embodiment of the invention. The automobile 20 of the embodiment includes the engine 22 as an internal combustion engine, an automatic transmission 26 that converts power from the engine 22 and transmits the converted power to drive wheels 39a and 39b via a differential gear 38, a starter motor 40 that cranks the engine 22 via a gear mechanism 31, and an electronic control unit 50 that controls the start and stop of the engine 22 and a driving system of the automobile 20. The starting apparatus 30 for the engine 22 in this embodiment includes the gear mechanism 31, the starter motor 40, and the electronic control unit 50. The automobile 20 of the embodiment also has an alternator 42 that converts the power from the engine 22 and generates electric power, which is to be supplied to, for example, a battery 44 and an air conditioner 46.

The gear mechanism 31 includes a crank gear 32 that is linked with a crankshaft 24 of the engine 22, a starter gear 33 that is linked with a rotating shaft 41 of the starter motor 40, and an intermediate gear 34 that engages with both the crank gear 32 and the starter gear 33. These gears 32, 33, and 34 are made of a resin, for example, engineering plastic like polyamide resin. A one-way clutch is incorporated in the intermediate gear 34. The one-way clutch is engaged in the process of cranking the engine 22 by means of the starter motor 40 and transmits the power from the starter motor 40 to the crankshaft 24 of the engine 22. The one-way clutch is disengaged at a stop of cranking the engine 22 and disconnects the starter motor 40 from the engine 22.

The electronic control unit 50 is constructed as a microprocessor including a CPU 52, a ROM 54 that stores processing programs, a RAM 56 that temporarily stores data, and non-illustrated input and output ports. The electronic control unit 50 receives, via the non-illustrated input port, a revolution speed Ne of the engine 22 measured by and sent from a revolution speed sensor 25, which is attached to the crankshaft 24 of the engine 22 and measures revolution speeds of the engine 22 in both normal and reverse directions, a gearshift position SP sent from a gearshift position sensor 62 that detects the current position of a gearshift lever 61 set by the driver's gearshift operation, an accelerator opening AP sent from an accelerator position sensor 64 that senses the driver's step-on amount of an accelerator pedal 63, a brake pedal position BP sent from a brake pedal position sensor 66 that senses the driver's step-on amount of a brake pedal 65, a vehicle speed V measured by and sent from a vehicle speed sensor 68, and an operation signal of the air conditioner 46 output from an air conditioner control panel 70. The electronic control unit 50 outputs, via the non-illustrated output port, a driving signal to an actuator (for example, a throttle valve) for driving the engine 22, a driving signal to a hydraulic circuit that changes over the change gear ratio set in the automatic transmission 26, a driving signal to an inverter for driving the starter motor 40, and a driving signal to an inverter for driving the air conditioner 46.

The automobile 20 of the embodiment constructed as discussed above basically carries out an idling stop control. The idling stop control automatically stops the engine 22 when preset stop conditions are met, for example, when the observed revolution speed Ne of the engine 22 is lowered to or below a predetermined level in an accelerator OFF position where the driver takes off the accelerator pedal 63 and in a brake ON position where the driver steps on the brake pedal 65 at a stop with the engine 22 idling (when the vehicle speed V is equal to 0). The idling stop control activates the starter motor 40 to automatically start the engine 22 when preset starting conditions are satisfied, for example, in response to a brake OFF operation, an accelerator ON operation, or an ON operation of the air conditioner 46.

Figure 2:
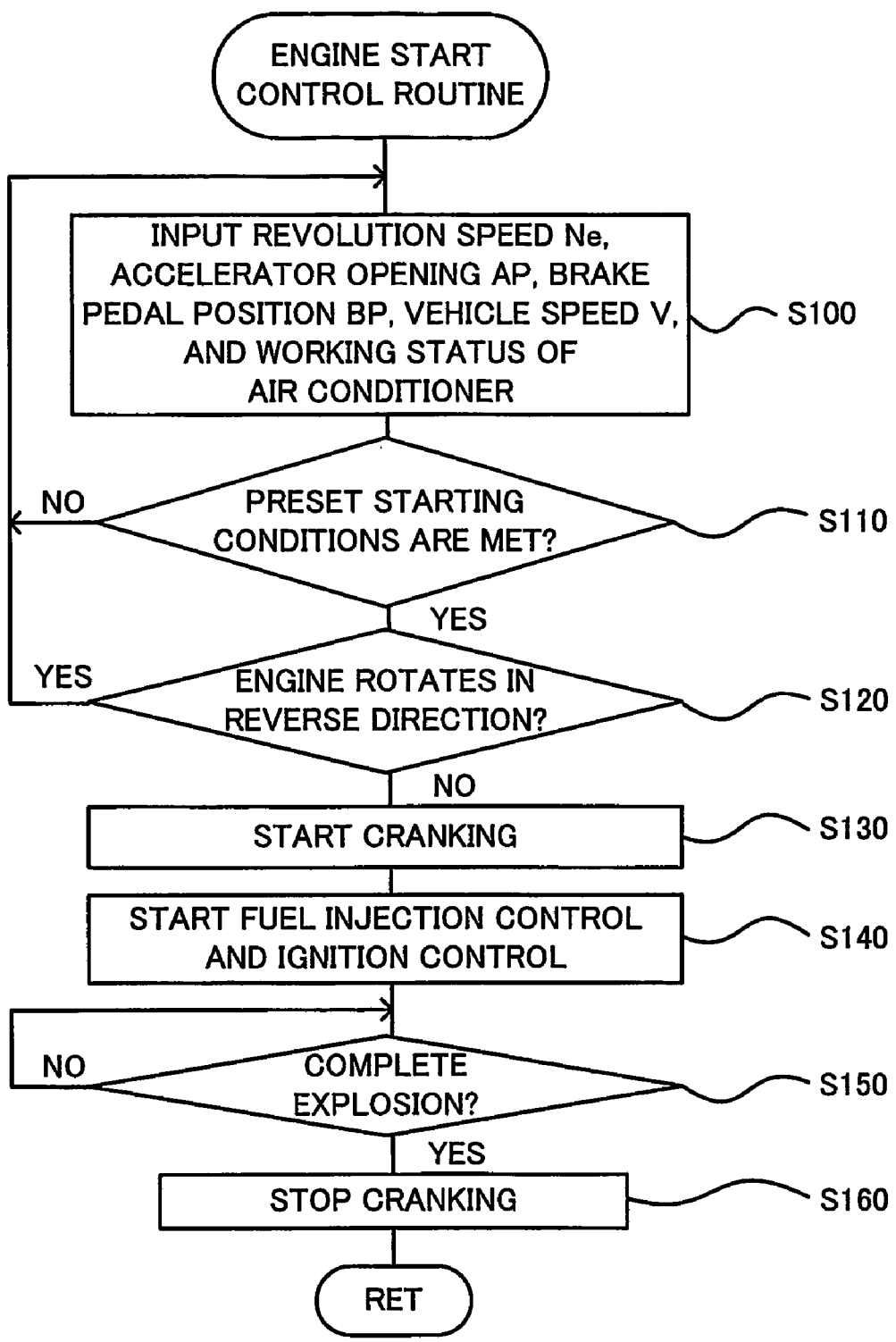
FIG. 2 is a flowchart showing an engine start control routine executed by the electronic control unit 50.

The following describes the operations of the automobile 20 of the embodiment having the configuration discussed above, especially series of operations to crank the engine 22 for a start when the preset starting conditions are satisfied under the idling stop control. FIG. 2 is a flowchart showing an engine start control routine executed by the electronic control unit 50. This engine start control routine is activated in response to a start of stop operations of the engine 22, for example, a fuel cut operation, when the preset stop conditions are met.

When the engine start control routine is activated, the CPU 52 of the electronic control unit 50 first receives the revolution speed Ne of the engine 22 from the revolution speed sensor 25, the accelerator opening AP from the accelerator pedal position sensor 64, the brake pedal position BP from the brake pedal position sensor 66, the vehicle speed V from the vehicle speed sensor 68, and data representing the working status of the air conditioner 46 (step S100), and waits until the input accelerator opening AP, brake pedal position BP, vehicle speed V, and working status of the air conditioner 46 meet the preset starting conditions (step S110).

When the preset starting conditions are met, the CPU 52 determines whether the engine 22 rotates in the reverse direction, based on the input revolution speed Ne of the engine 22 (step S120). When the preset stop conditions are fulfilled to stop the engine 22, a piston may not complete a compression cycle immediately before the engine stop and may be pressed back by the compressed air. In such cases, the engine 22 rotates in the reverse direction, and there is a relative revolution speed difference in the cranking direction between the engine side and the starter motor side of the intermediate gear 34. This engages the one-way clutch and transmits the rotation of the engine 22 in the reverse direction to rotate the rotating shaft 41 of the starter motor 44 in the reverse direction. The processing of step S120 determines whether such phenomenon arises. When it is determined at step S120 that the engine 22 does not rotate in the reverse direction, the CPU 52 actuates the starter motor 40 to start cranking the engine 22 (step S130). When it is determined at step S120 that the engine 22 rotates in the reverse direction, on the other hand, the CPU 52 judges the current timing as inadequate for cranking the engine 22 and returns to the processing of step S100 without cranking the engine 22. Actuation of the starter motor 40 to crank the engine 22 under rotation of the engine 22 and the starter motor 40 in the reverse direction may cause an excess stress to act on the rotating shaft 41 of the starter motor 40 and the gear mechanism 31 and may damage the rotating shaft 41 and the gear mechanism 31. This engine start control routine is activated at a start of the stop operations of the engine 22, as mentioned above. The preset starting conditions may be met, while the fuel supply is cut off and the engine 22 still continues rotating by the inertial force. Even in such cases, the routine starts cranking the engine 22 unless the engine 22 rotates in the reverse direction.

After the start of cranking of the engine 22, the CPU 52 starts a fuel injection control and an ignition control (step S140), waits for complete combustion of the engine 22 (step S150), and stops cranking the engine 22 (step S160). The engine start control routine is then terminated.

Figure 3:
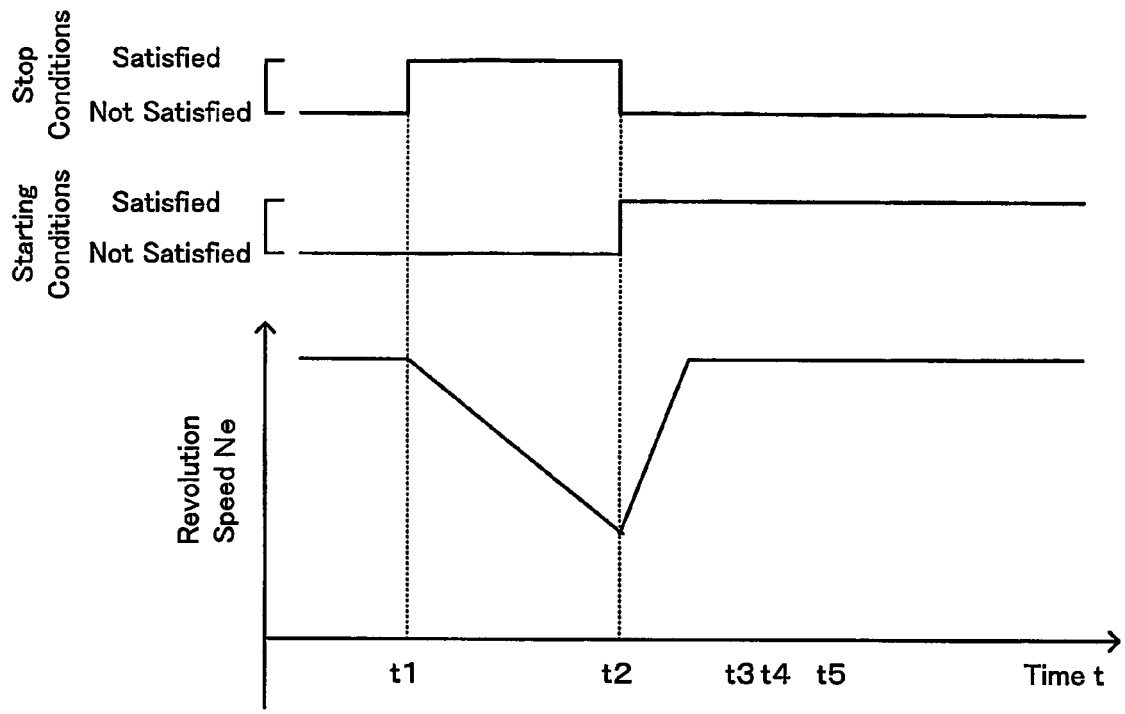
FIG. 3 shows a process of cranking the engine 22 for a start when the preset starting conditions are met after fulfillment of the preset stop conditions.
Figure 3:
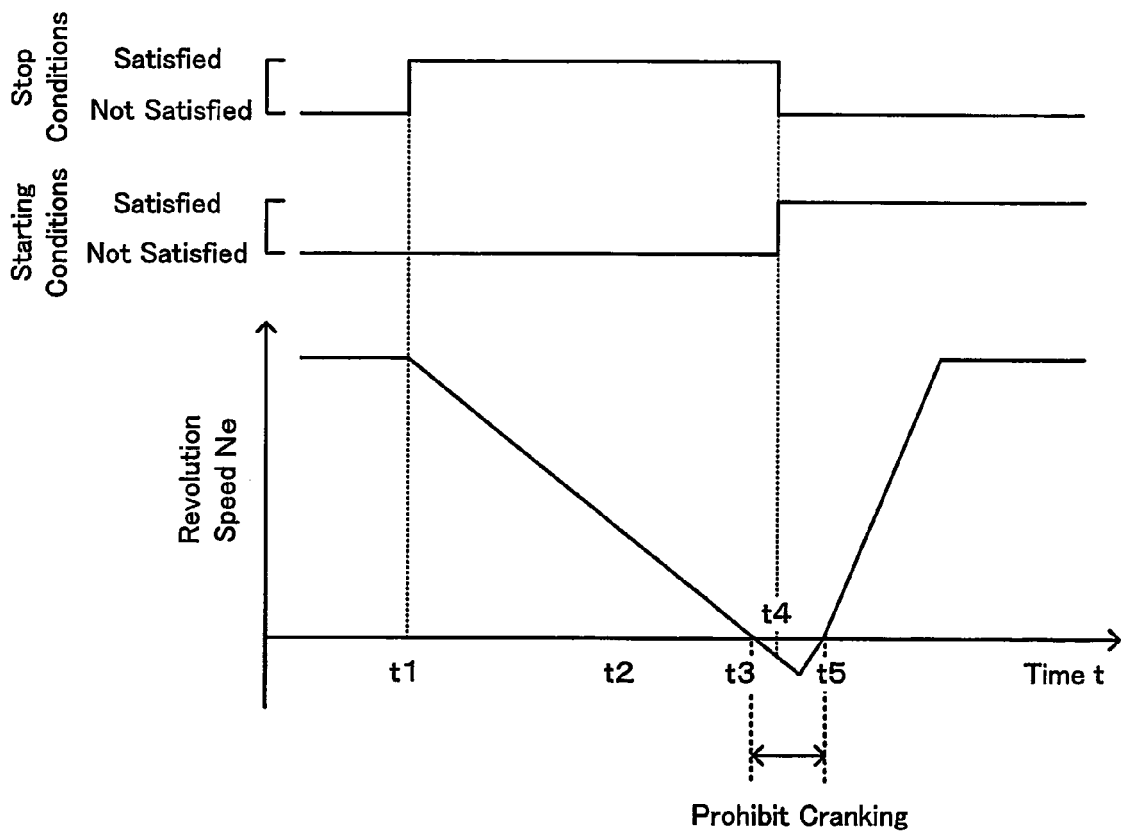

FIG. 3 shows a process of cranking the engine 22 for a start when the preset starting conditions are met after fulfillment of the preset stop conditions. In a state of FIG. 3(a), the preset stop conditions are met to start the stop operations of the engine 22 at a time point t1. The preset starting conditions are then met at a time point t2 while the engine 22 still continues rotating by the inertial force. In this state, the rotating direction of the engine 22 is not the reverse direction, so that the routine immediately actuates the starter motor 40 to crank the engine 22 for a start. In another state of FIG. 3(b), the preset starting conditions are met at a time point t4 while the engine 22 rotates in the reverse direction. In this state, the routine waits until the rotation of the engine 22 in the reverse direction stops and cranks the engine 22 for a start at a time point t5.

As described above, the automobile 20 of the embodiment does not actuate the starter motor 40 to crank the engine 22 even when the preset starting conditions are met during rotation of the engine 22 and the starter motor 40 in the reverse direction after the fulfillment of the preset stop conditions to start the stop operations of the engine 22. This arrangement desirably restrains the stress acting on the rotating shaft 41 of the starter motor 40 and the gear mechanism 31 and thereby effectively prevents potential damage of the rotating shaft 41 and the gear mechanism 31. The automobile 20 of the embodiment immediately cranks the engine 22 when the preset starting conditions are met while the engine 22 still continues rotating in the normal operating direction by the inertial force after the fulfillment of the preset stop conditions to start the stop operations of the engine 22. This ensures a prompt start of the engine 22. In the automobile 20 of the embodiment, the respective gears 32, 33, and 34 included in the gear mechanism 31 are made of resin. This effectively restricts the potential noise and vibrations in the process of cranking the engine 22, while desirably reducing the total weight of the gear mechanism 31 and enhancing the productivity of the gear mechanism 31.

In the automobile 20 of the embodiment, the one-way clutch is incorporated in the intermediate gear 33 of the gear mechanism 31. The one-way clutch may be omitted from the intermediate gear 33 of the gear mechanism 31. In this modified structure, actuation of the engine 22 automatically leads to actuation of the starter motor 40.

In the automobile 20 of the embodiment, the crankshaft 24 of the engine is connected to the rotating shaft 41 of the starter motor 40 via the gear mechanism 31 of the three gears (the crank gear 32, the starter gear 33, and the intermediate gear 34). The number of the coupling gears is not essential and the crankshaft 24 of the engine 22 may be coupled with the rotating shaft 41 of the starter motor 40 by any arbitrary number of gears.

In the automobile 20 of the embodiment, the respective gears 32, 33, and 34 included in the gear mechanism 31 are made of resin. These gears may alternatively be made of metal.

Figure 4:
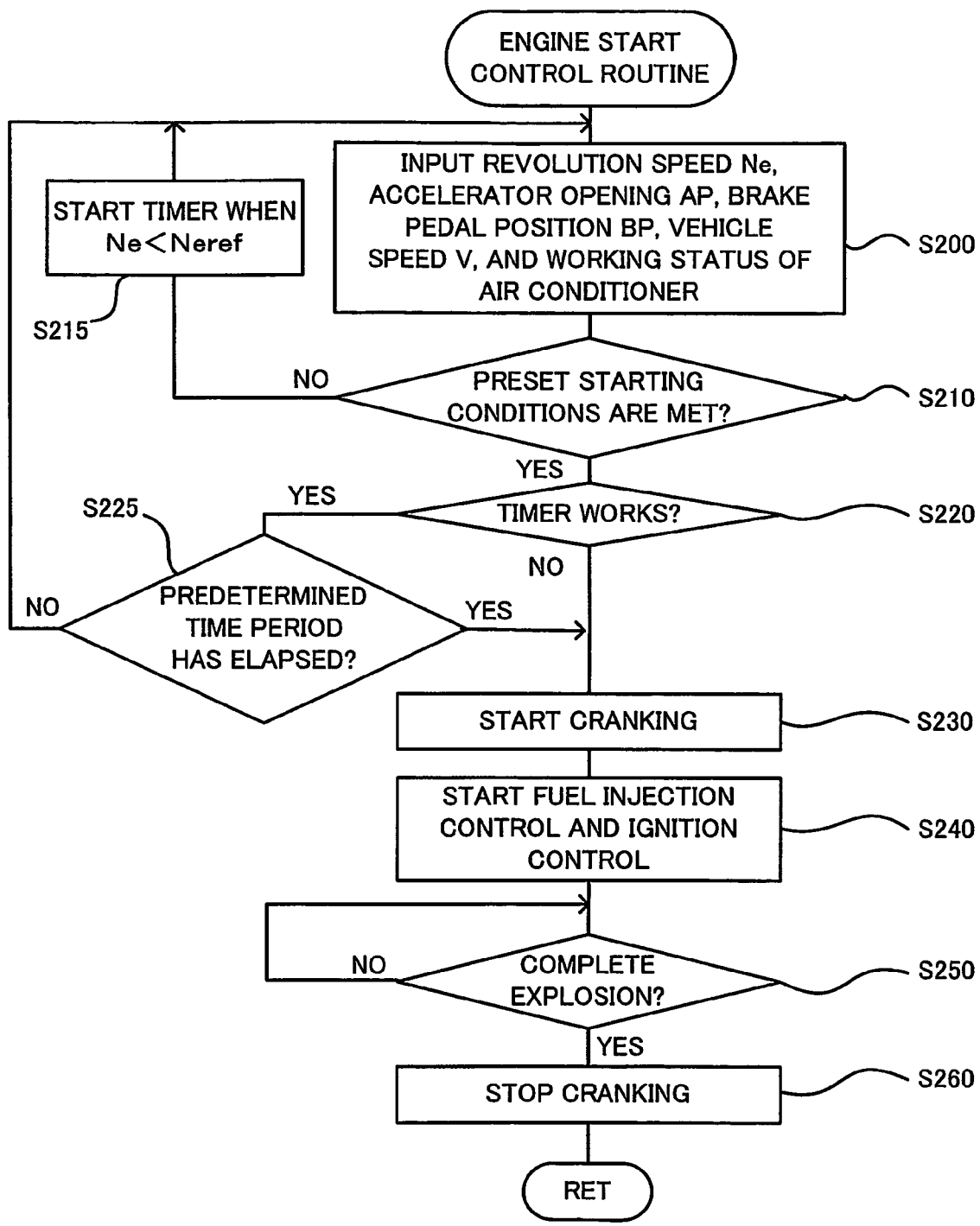
FIG. 4 is a flowchart showing an engine start control routine executed by the electronic control unit 50 in one modified example.

The automobile 20 of the embodiment uses the revolution speed sensor 25 to directly measure the reverse rotation of the engine 22 and adjusts the timing of cranking the engine 22. One modified structure may use a revolution speed sensor that can not discriminate reverse rotation from normal rotation of the engine 22. In this case, the engine start control presumes the reverse rotation of the engine 22 based on the revolution speed measured by the revolution speed sensor and adjusts the timing of cranking the engine 22. FIG. 4 is a flowchart showing an engine start control routine executed by the electronic control unit 50 in one modified example. The engine start control routine of this modified example is activated in response to a start of the stop operations of the engine 22, for example, a fuel cut operation, when the preset stop conditions are met.

When the engine start control routine is activated, the CPU 52 of the electronic control unit 50 executes the same processing as that of steps S100 and S110 in the engine start control routine of the embodiment shown in FIG. 2 and waits until fulfillment of the preset starting conditions of the engine 22 (steps S200 and S210). The CPU 52 monitors the input revolution speed Ne of the engine 22 and starts a timer at a timing when the input revolution speed Ne falls below a predetermined level Neref (step S215). The predetermined level Neref is set equal to zero or a small revolution speed immediately before zero, and is determined according to the performance of the revolution speed sensor and the processing speed of signals from the revolution speed sensor. When the preset starting conditions are met, the CPU 52 determines whether the timer works (step S220) and in the ON condition of the timer, subsequently determines whether a predetermined time period tref has elapsed since the start of the timer (step S225). When it is determined at step S220 that the timer does not work or when it is determined at step S225 that the predetermined time period tref has elapsed since the start of the timer, the CPU 52 starts cranking the engine 22 (step S230). When it is determined at steps S220 and S225 that the timer works and the predetermined time period tref has not yet elapsed since the start of the timer, on the other hand, there is a possibility that the engine 22 and the starter motor 40 rotate in the reverse direction. The CPU 52 thus judges the current timing as inadequate for cranking the engine 22 and returns to the processing of step S200 without cranking the engine 22. This modified engine start control routine presumes the reverse rotation of the engine 22 and the starter motor 40 due to the phenomenon discussed above and prohibits cranking the engine 22, until the predetermined time period tref has elapsed since the start of the engine stop operations to cut off the fuel supply and lower the revolution speed Ne of the engine 22 below the preset level Neref, which represents a state immediately before the complete stop of the engine 22. One concrete procedure of setting the predetermined time period tref may experimentally measure a time period, when a stop of the engine 22 at idling causes the piston to be pressed back by the compressed air and to rotate the engine 22 in the reverse direction, multiple times and sets the maximum among the measured time periods to the predetermined time period tref. When the timer does not work, that is, when the preset starting conditions are met prior to a start of the timer, the engine stop operations have been carried out to cut off the fuel supply and the engine 22 continues rotating in the normal direction by the inertial force. The CPU 52 thus cranks the engine 22 at step S230. After the start of cranking of the engine 22, the modified engine start control routine executes the same processing as that of steps S140 through S160 in the engine start control routine of FIG. 2 to start the engine 22 (steps S240 through S260) and is then terminated.

Figure 5:
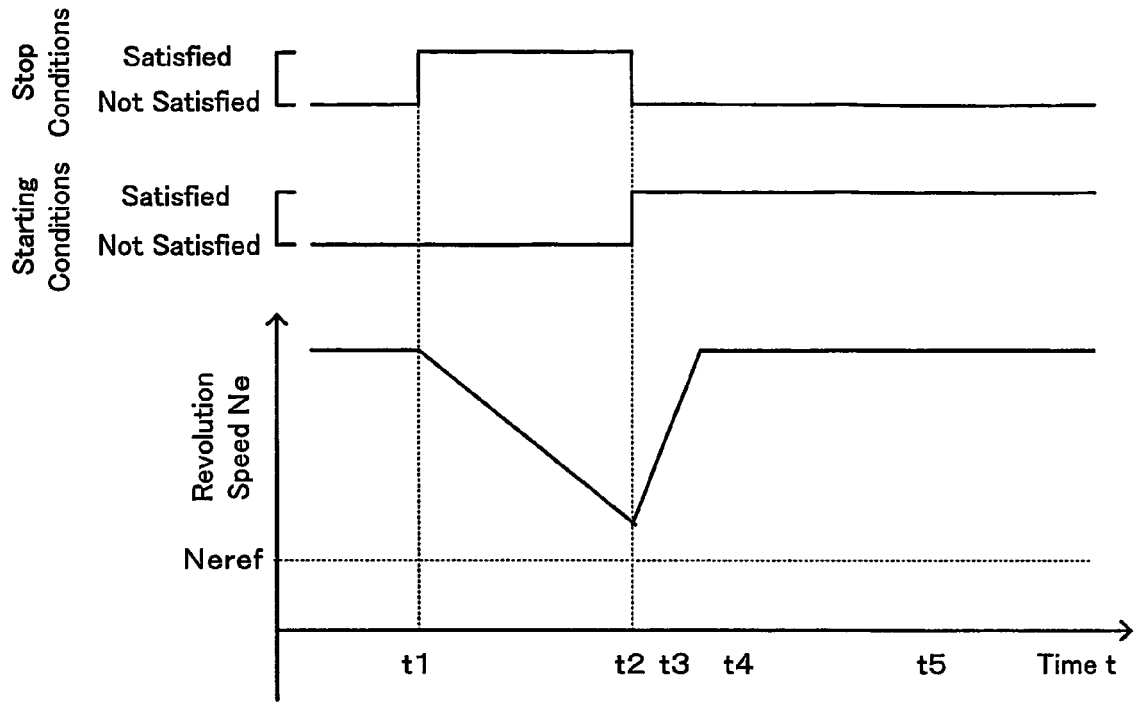
FIG. 5 shows a process of cranking the engine 22 for a start when the preset starting conditions are met after fulfillment of the preset stop conditions.
Figure 5:
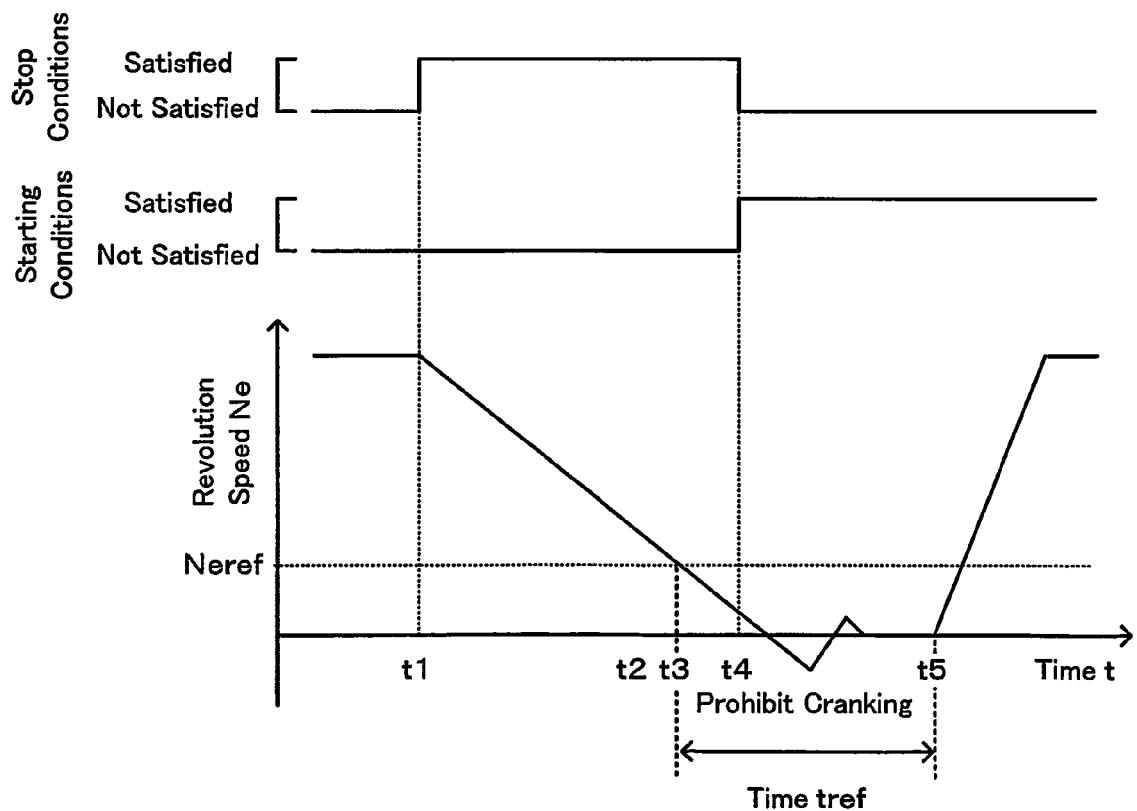

FIG. 5 shows a process of cranking the engine 22 for a start when the preset starting conditions are met after fulfillment of the preset stop conditions. In a state of FIG. 5(*a*), the preset stop conditions are met to start the stop operations of the engine 22 at a time point t1. The preset starting conditions are then met at a time point t2 while the engine 22 still continues rotating by the inertial force at the revolution speed Ne, which is not less than the preset level Neref. In this state, the routine presumes inactivation of the timer, which starts at a fall of the revolution speed Ne below the preset level Neref and no reverse rotation of the engine 22. The routine thus immediately actuates the starter motor 40 to crank the engine 22 for a start. In another state of FIG. 5(*b*), the preset starting conditions are met at a time point t4 prior to elapse of the predetermined time period tref since the start of the timer in response to a fall of the revolution speed Ne below the preset level Neref. In this state, the routine presumes reverse rotation of the engine 22 and cranks the engine 22 after elapse of the predetermined time period tref.

As described above, the modified engine start control routine of FIG. 4 does not actuate the starter motor 40 to crank the engine 22 even when the preset starting conditions are fulfilled under presumption of the reverse rotation of the engine 22. Such presumption is given until the predetermined time period tref has elapsed since the fall of the revolution speed Ne of the engine below the preset level Neref after the fulfillment of the preset stop conditions to start the stop operations of the engine 22. Like the embodiment discussed above, this modified arrangement desirably prevents an excess stress from acting on the rotating shaft 41 of the starter motor 40 and the gear mechanism 31 and thereby effectively restrains potential damage of the rotating shaft 41 and the gear mechanism 31. This modified engine start control routine immediately cranks the engine 22 when the preset starting conditions are met while the revolution speed Ne of the engine 22 is not less than the preset level Neref, that is, while the engine 22 still continues rotating by the inertial force after the start of the engine stop operations. This ensures a quick start of the engine 22. Direct measurement of the reverse rotation of the engine 22 is not essential for execution of such processing.

The engine start control routine of FIG. 2 executed in the automobile 20 of the embodiment prohibits cranking the engine 22 in response to detection of the reverse rotation of the engine 22 at step S120. The modified engine start control routine of FIG. 4 prohibits cranking the engine 22 until elapse of the predetermined time period tref since the fall of the revolution speed Ne of the engine 22 below the preset level Neref at steps S215 through S225. Such prohibition of cranking is, however, not essential. As long as application of an excess load to the driving system including the gear mechanism 31 is effectively preventable, cranking of the engine 22 may be allowed under a slight reverse rotation of the engine 22. The allowable range is determined by taking into account the strength of the driving system.

Figure 6:
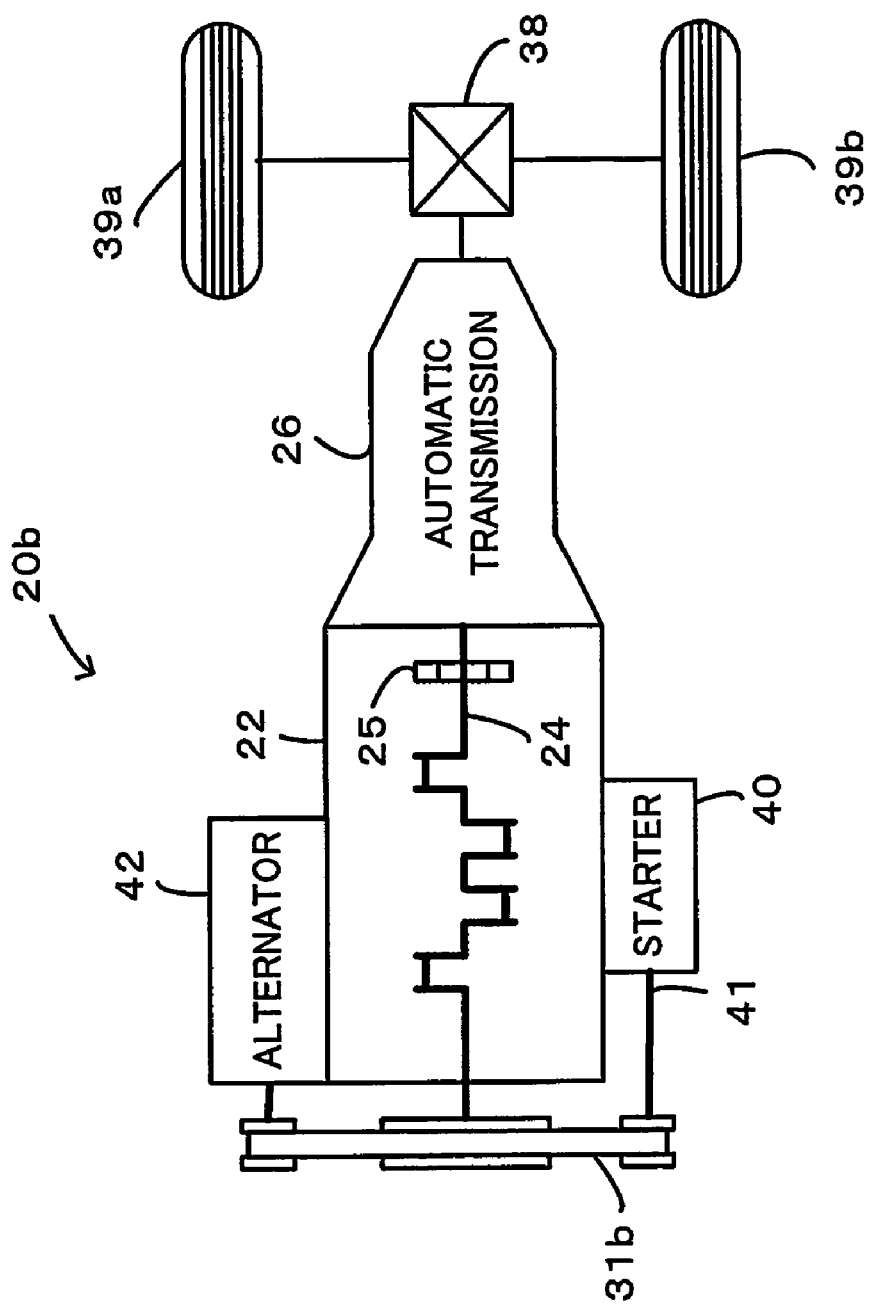
FIG. 6 schematically illustrates the configuration of an automobile 20b with a starting apparatus 30 for an engine 22 of a modified structure.

In the automobile 20 of the embodiment, the rotating shaft 41 of the starter motor 40 is connected to the crankshaft 24 of the engine 22 via the gear mechanism 31. In an automobile 20b of a modified structure shown in FIG. 6, pulleys are attached respectively to the rotating shaft 41 of the starter motor 40 and to the crankshaft 24 of the engine 22. A belt is spanned between the two pulleys to couple the rotating shaft 41 of the starter motor 40 with the crankshaft 24 of the engine 22. The automobile 20b of this modified structure executes the engine start control routine of FIG. 2 or the modified engine start control routine of FIG. 4 to prevent damage or slippage of the belt.

The embodiment regards the automobile with the starting apparatus 30 for the engine 22 mounted thereon. The starting apparatus for the internal combustion engine of the invention may be mounted on diverse moving bodies including automobiles, diversity of other vehicles, ships and boats, and aircraft, as well as to stationary equipment, such as a driving device for construction machinery.

The above embodiment is to be considered in all aspects as illustrative and not restrictive. There may be many modifications, changes, and alterations without departing from the scope or sprit of the main characteristics of the present invention. All changes within the meaning and range of equivalency of the claims are therefore intended to be embraced therein.

INDUSTRIAL APPLICABILITY

The technique of the invention is effectively applicable to automobile industries and machine industries.

The invention claimed is:

1. A starting apparatus for an internal combustion engine, which is mounted on an automobile to automatically start the internal combustion engine after an auto stop of the internal combustion engine with fulfillment of the auto stop condition including accelerator off and brake on, when the auto start condition including accelerator on or brake off is fulfilled, said starting apparatus comprising:
   a cranking module that is always connected to an output shaft of the internal combustion engine via a power transmission member and cranks the internal combustion engine through actuation of a rotating shaft, which is interlocked with rotation of the output shaft;
   a reverse rotation presumption module that determines a reverse rotation state of the internal combustion engine based on the measured revolution speed of the internal combustion engine, wherein the reverse rotation state is a reverse rotation of the internal combustion engine due to the incompletion of a compression cycle immediately before stopping of the internal combustion engine when the internal combustion engine is auto stopped with fulfillment of the auto stop condition; and
   a cranking control module that controls said cranking module when the auto start condition is fulfilled when the internal combustion engine is auto stopped with fulfillment of the auto stop condition,
   wherein, when the internal combustion engine is not in the reverse rotation state, the cranking control module controls the cranking module to crank the internal combustion engine, and
   wherein, when the internal combustion engine is in the reverse rotation state, the cranking control module controls the cranking module to crank the internal combustion engine after the internal combustion engine is not in the reverse rotation state.

2. A starting apparatus in accordance with claim 1, wherein the internal combustion engine is in the reverse rotation state until the measured revolution speed of the internal combustion engine falls below a predetermined level and a predetermined time period elapses after the fall to eliminate any potential for the reverse rotation of the internal combustion engine.

3. A starting apparatus in accordance with claim 1, wherein the power transmission member is either of a full-time jaw gear that couples the output shaft with the rotating shaft or a belt that is spanned between the output shaft and the rotating shaft.

4. A starting apparatus in accordance with claim 1, wherein the power transmission member is made of resin.

5. An automobile with an internal combustion engine mounted thereon, said automobile comprising:
   a cranking module that is always connected to an output shaft of the internal combustion engine via a power transmission member and cranks the internal combustion engine through actuation of a rotating shaft, which is interlocked with rotation of the output shaft;
   a reverse rotation presumption module that determines a reverse rotation state of the internal combustion engine based on the measured revolution speed of the internal combustion engine, wherein the reverse rotation state is a reverse rotation of the internal combustion engine due to the incompletion of a compression cycle immediately before stopping of the internal combustion engine when the internal combustion engine is auto stopped with fulfillment of the auto stop condition; and
   a cranking control module that controls said cranking module when the auto start condition is fulfilled when the internal combustion engine is auto stopped with fulfillment of the auto stop condition at automatically staffing of the internal combustion engine after an auto stop of the internal combustion engine with fulfillment of auto stop condition including accelerator off and brake on, when auto start condition including accelerator on or brake off is fulfilled,
   wherein, when the internal combustion engine is not in the reverse rotation state, the cranking control module controls the cranking module to crank the internal combustion engine, and wherein, when the internal combustion engine is in the reverse rotation state, the cranking control module controls the cranking module to crank the internal combustion engine after the internal combustion engine is not in the reverse rotation state.

6. An automobile in accordance with claim 5, wherein the internal combustion engine is in the reverse rotation state until the measured revolution speed of the internal combustion engine falls below a predetermined level and a predetermined time period elapses after the fall to eliminate any potential for the reverse rotation of the internal combustion engine.

7. An automobile in accordance with claim 5, wherein the power transmission member is made of resin.

* * * * *